United States Patent
Libby et al.

(10) Patent No.: US 6,941,433 B1
(45) Date of Patent: Sep. 6, 2005

(54) SYSTEMS AND METHODS FOR MEMORY READ RESPONSE LATENCY DETECTION

(75) Inventors: Jeffrey G. Libby, Cupertino, CA (US); Raymond M. Lim, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 428 days.

(21) Appl. No.: 10/152,006

(22) Filed: May 22, 2002

(51) Int. Cl.[7] ................................................ G06F 12/00

(52) U.S. Cl. ...................... 711/167; 711/115; 711/147; 711/154; 365/191; 365/194

(58) Field of Search ....................... 711/167, 115, 147, 711/154; 365/191, 194

(56) References Cited

U.S. PATENT DOCUMENTS

| | | | | |
|---|---|---|---|---|
| 5,655,113 A | * | 8/1997 | Leung et al. | 713/401 |
| 5,809,517 A | * | 9/1998 | Shimura | 711/115 |
| 5,917,760 A | * | 6/1999 | Millar | 365/194 |
| 6,067,606 A | * | 5/2000 | Holscher et al. | 711/167 |
| 6,330,645 B1 | * | 12/2001 | Harriman | 711/151 |
| 6,445,624 B1 | * | 9/2002 | Janzen et al. | 365/191 |
| 2002/0184461 A1 | * | 12/2002 | Zumkehr | 711/167 |
| 2002/0188816 A1 | * | 12/2002 | Johnson et al. | 711/167 |

* cited by examiner

Primary Examiner—Stephen Elmore
(74) Attorney, Agent, or Firm—Harrity & Snyder, LLP

(57) ABSTRACT

A system for determining a memory read latency includes a memory, a memory read circuit, and a latency detector. An identifiable pattern of data is written to at least one location in the memory, and a read request and the address of the identified pattern are sent to the memory. The latency detector determines a read latency period based on detecting the identifiable pattern of data.

28 Claims, 4 Drawing Sheets

SYSTEMS AND METHODS FOR MEMORY READ RESPONSE LATENCY DETECTION

BACKGROUND OF THE INVENTION

A. Field of the Invention

The present invention relates generally to data processing systems and, more particularly, to systems and methods for detecting a memory read response latency in data processing systems.

B. Description of Related Art

Many conventional data processing systems require the use of random access memories (RAMs) for storing data essential for system functionality. Such systems include network devices, such as routers or bridges, in which essential routing data may be maintained in RAM devices. In systems employing certain types of RAMs, variations in the delay of the read response data from the RAMs may be substantial. The read response delay may depend on the particular RAM used in the data processing system. The read response delay represents the period between a data request to a RAM and the time at which the data propagates from the RAM to be received at the requesting circuitry. In some data processing systems, the RAM may generate a return clock (e.g., to clock the requested data into a requesting device/system) based on an input clock received from the data requesting device that includes a significant amount of skew relative to the input clock. This "clock skew" further induces a delay between a data read request and the time at which the data can be received, clocked, and read at the data requesting device or system. These delay variations may be due to a number of causes, including delay induced by on-chip gates and delay induced by printed circuit board (PCB) wires. The read response delay may further vary from circuit board to circuit board and even can vary between different RAMs on the same circuit board.

Conventionally, read response latency has been accounted for by assuming a worst case delay and synchronizing the read circuitry accordingly. Thus, during a RAM data read process in which less delay than the worst case exists, an unnecessary delay is introduced into the read process beyond what is necessary to read the data from memory. This unnecessary delay, when multiplied by numerous data reads, hinders the maximum read access capability of the data processing system and, thus, limits the quantity of data retrievable from RAM over any given period of time.

Therefore, there exists a need for systems and methods in data processing systems that can improve the read access capability of the data processing systems and, thereby, increase the quantity of data that can be retrieved from RAM during a given period.

SUMMARY OF THE INVENTION

Consistent with the principles of the invention disclosed and claimed herein, these and other needs are addressed by implementing circuitry in data processing systems that enables the detection of memory read latency. The detected memory read latency may then, consistent with the principles of the invention, be used to synchronize memory read circuitry so as to account for the detected latency when performing each memory read from memory. By providing a read latency parameter that may be selectively updated, systems and methods consistent with the principles of the invention improve the system read access capability and increase the quantity of data that can be retrieved from memory as compared to conventional fixed, worst case, read response delays.

In accordance with the principles of the invention as embodied and broadly described herein a method of determining a memory read latency includes writing an identifiable pattern of data to at least one location in a memory; sending a read request and an address to the memory, the address identifying the at least one location in memory; and determining a read latency period based on detecting the identifiable pattern of data.

In another implementation consistent with the principles of the invention, a method for synchronizing a memory read includes detecting a latency based on when requested data is received; and synchronizing a data read circuit to account for the detected latency when reading data from the memory.

In yet another implementation consistent with the principles of the invention, a method for synchronizing a memory read in a data processing system includes selectively detecting latencies based on data read requests sent to a memory and receiving the requested data; and updating synchronization of a data read circuit when reading data from the memory to account for each of the selectively detected latencies.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents of the claim features.

Systems and methods consistent with the principles of the invention permit the detection of memory read response latency in data processing systems. The detected read response latency may be used for synchronizing memory read circuitry to enable the circuitry to account for the detected latency when reading data from RAM. The detected read response latency may also be selectively updated such that the memory read circuitry can minimize any delays in processing data read from memory.

Exemplary Data Processing System

Figure 1:
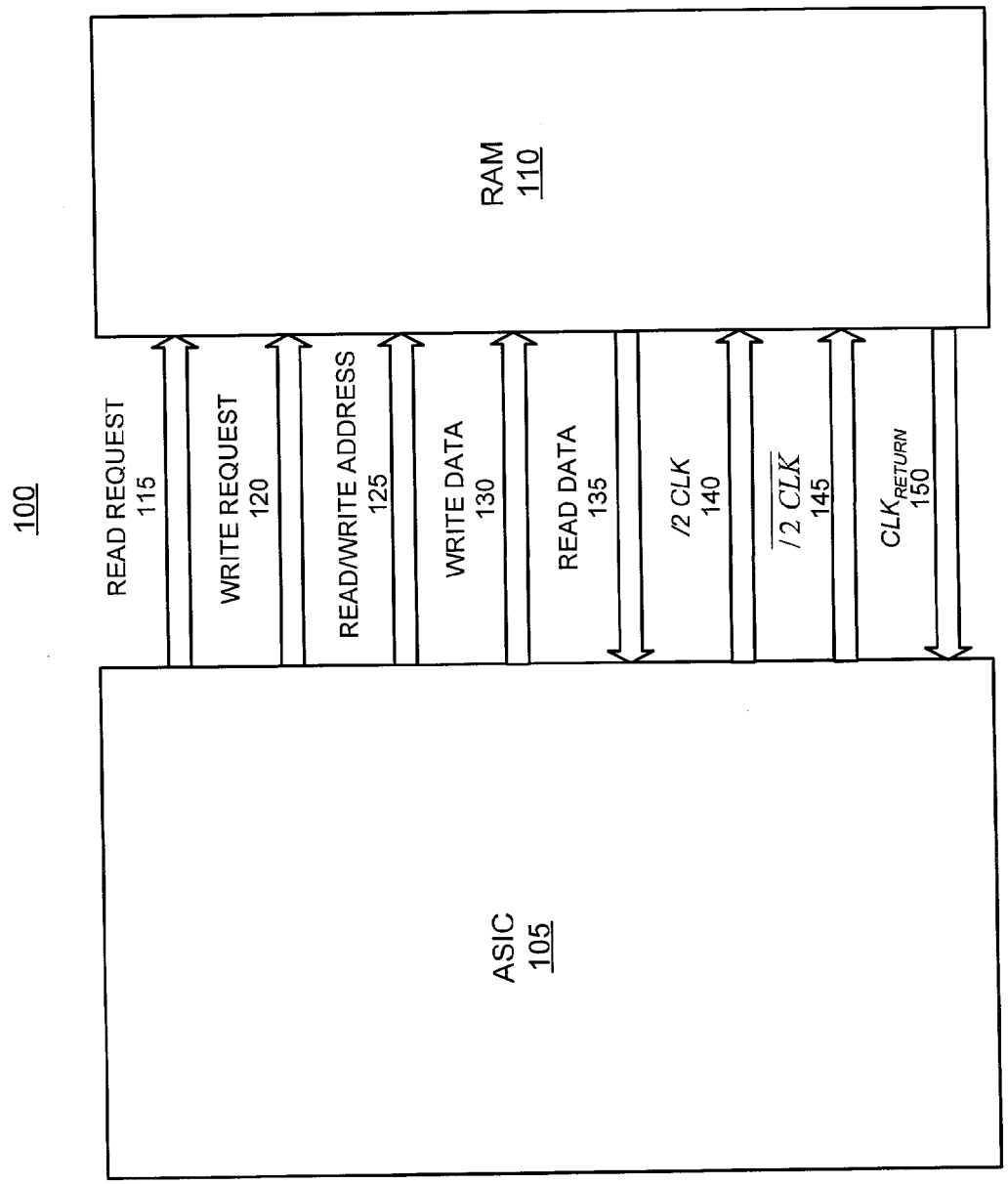
FIG. 1 is an exemplary diagram of a data processing system consistent with the principles of the invention.

FIG. 1 is a diagram of an exemplary data processing system 100. System 100 may be associated with a network device, such as a router or bridge. System 100 may include an application specific integrated circuit (ASIC) 105 interconnected with a RAM 110 via read request line 115, write request line 120, read/write address line 125, write data line 130, read data line 135, /2 clock (CLK) line 140, /2CLK line 145, and clock return (CLK$_{RETURN}$) line 150. ASIC 105 sends and receives signals over the lines to perform read and write operations. The read and write operations may be performed by ASIC 105 or as part of processing by elements connected to ASIC 105 (not shown), or both.

Read request line 115 supplies a request to read data from RAM 110 from a location specified by read/write address line 125. Write request line 120 supplies a request to write data from ASIC 105 to RAM 110 in a memory location specified by read/write address line 125. Write data line 130 supplies data to RAM 110 in response to a write request. Read data line 135 retrieves data from RAM 110 in response to a read request. Clock signals from /2 CLK line 140 and /2CLK line 145 may be provided by ASIC 105 to RAM 105. RAM 105 returns the clock to ASIC 105 in the form of a clock return signal on CLK$_{RETURN}$ line 150. ASIC 105 may use the clock signals to synchronize the read and write operations being performed with RAM 110.

Exemplary Asic

Figure 2:
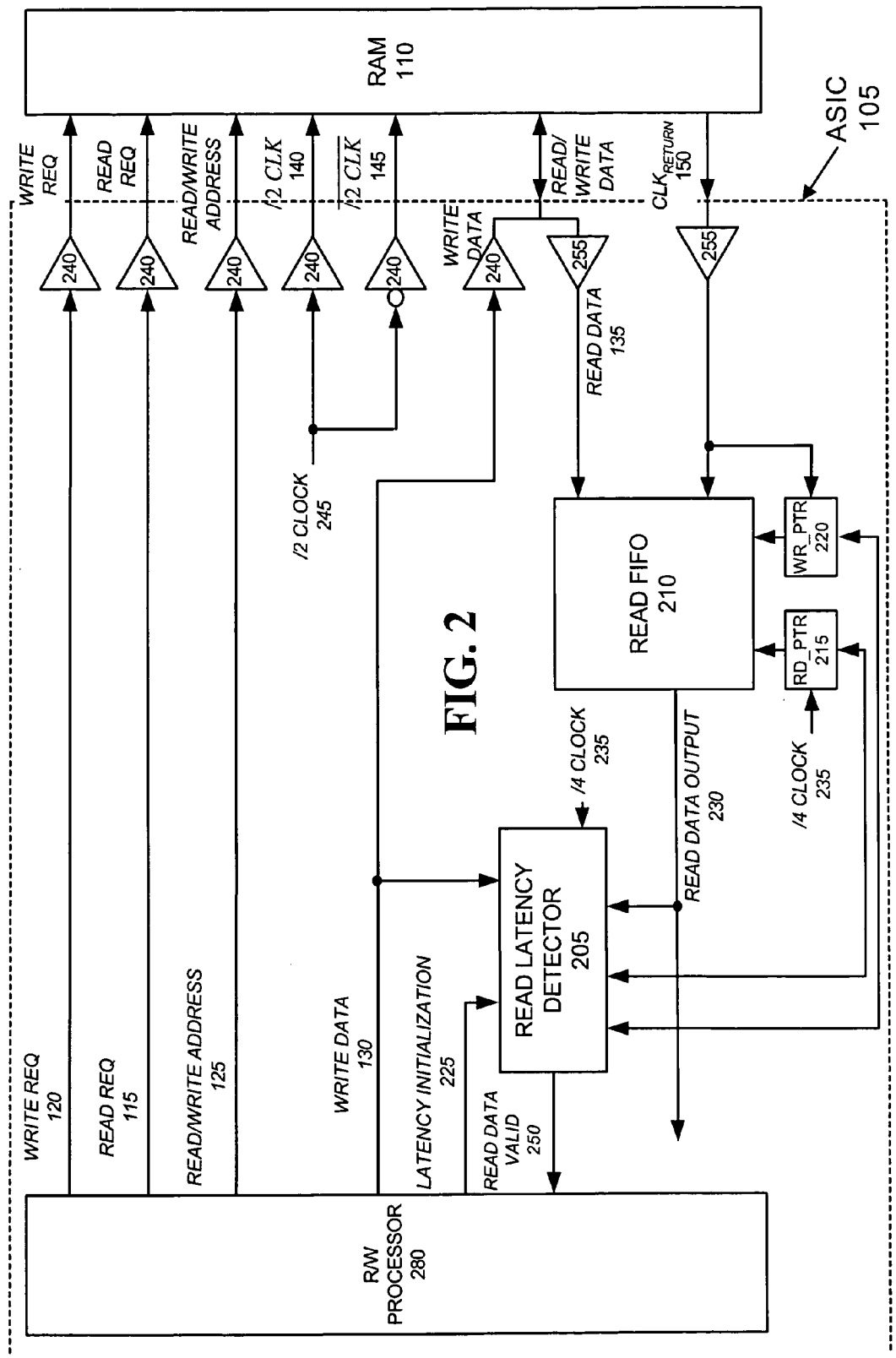
FIG. 2 is a diagram of exemplary components of the application specific integrated circuit (ASIC) of FIG. 1 according to an implementation consistent with the principles of the invention.

FIG. 2 is a diagram of an exemplary ASIC 105 of system 100. ASIC 105 may include a read/write (R/W) processor 280, a read latency detector 205, a read first-in-first-out (FIFO) queue 210, a read pointer (rd_ptr) 215 and a write pointer (wr_ptr) 220. Read latency detector 210 may determine a memory read response latency according to the exemplary process further described below. In some embodiments, read latency detector 205 may include a processing unit which performs instructions in accordance with the exemplary process described below with respect to FIG. 3. In other embodiments, read latency detector 205 may include equivalent logic circuitry for performance of the exemplary process.

R/W processor 280 first writes an identifiable pattern of data to RAM 110 over write data line 130. Read latency detector 205 may also receive the identifiable pattern over write data line 130. R/W processor 280 may then send a latency initialization signal to read latency detector 205 on latency initialization line 225 and may then request the identifiable pattern of data from RAM 110 via read request line 115. Read latency detector 205 may count the number of latency cycles from the read request until the identifiable data pattern is detected on read data output line 230. The latency cycles will account for the amount of skew (e.g., phase shift) introduced by RAM 110 when returning the /2 clock as a return clock (CLK$_{RETURN}$) 150 via input buffer 255. Read latency detector 205 may then set an offset between rd_ptr 215 and wr_ptr 220 that is based on the number of cycles of latency such as is determined in accordance with the exemplary process of FIG. 3 below. wr_ptr 220 may point to a location in read FIFO 210 at which data received from RAM 110, via read data line 135, may be written. wr_ptr 220 may be incremented at each clock signal of CLK$_{RETURN}$ 150 received from RAM 110. rd_ptr 215 may point to a location in read FIFO 210 at which data, that has been written by wr_ptr 220, may be retrieved and passed to read data output line 230. rd_ptr 215 may be incremented at each clock signal of /4 clock 235. Read latency detector 205 may also generate a read data valid signal on read data valid line 250 to indicate to R/W processor 280 that the data from read FIFO 210 is valid.

Read FIFO 210 may receive read data from RAM 110 in response to read requests supplied via read request line 115. Read FIFO 215 may receive and store, in a first-in-first-out manner, requested read data from RAM 110 via input buffer 255 and read data line 135.

As shown in FIG. 2, write requests received on write request line 120 may be passed on to RAM 110 via an output buffer 240. Read requests received on read request line 115 may be passed on to RAM 110 via an output buffer 240. Read or write addresses received on read/write address line 125 may be passed on to RAM 110 via an output buffer 240. Data received on write data line 130 may be passed on to RAM 110 via n output buffer 240. A clock signal 245 (/2 clock), and its complement, may be passed to RAM 110 via output buffers 240. In some embodiments, additional components (e.g., registers) may be connected before the output buffers 240 on any data transfer line, such as, for example, write request line 120, read request line 115, read/write address line 125, write data line 130 and read data line 135.

Exemplary Memory Read Latency Detection Process

Figure 3:
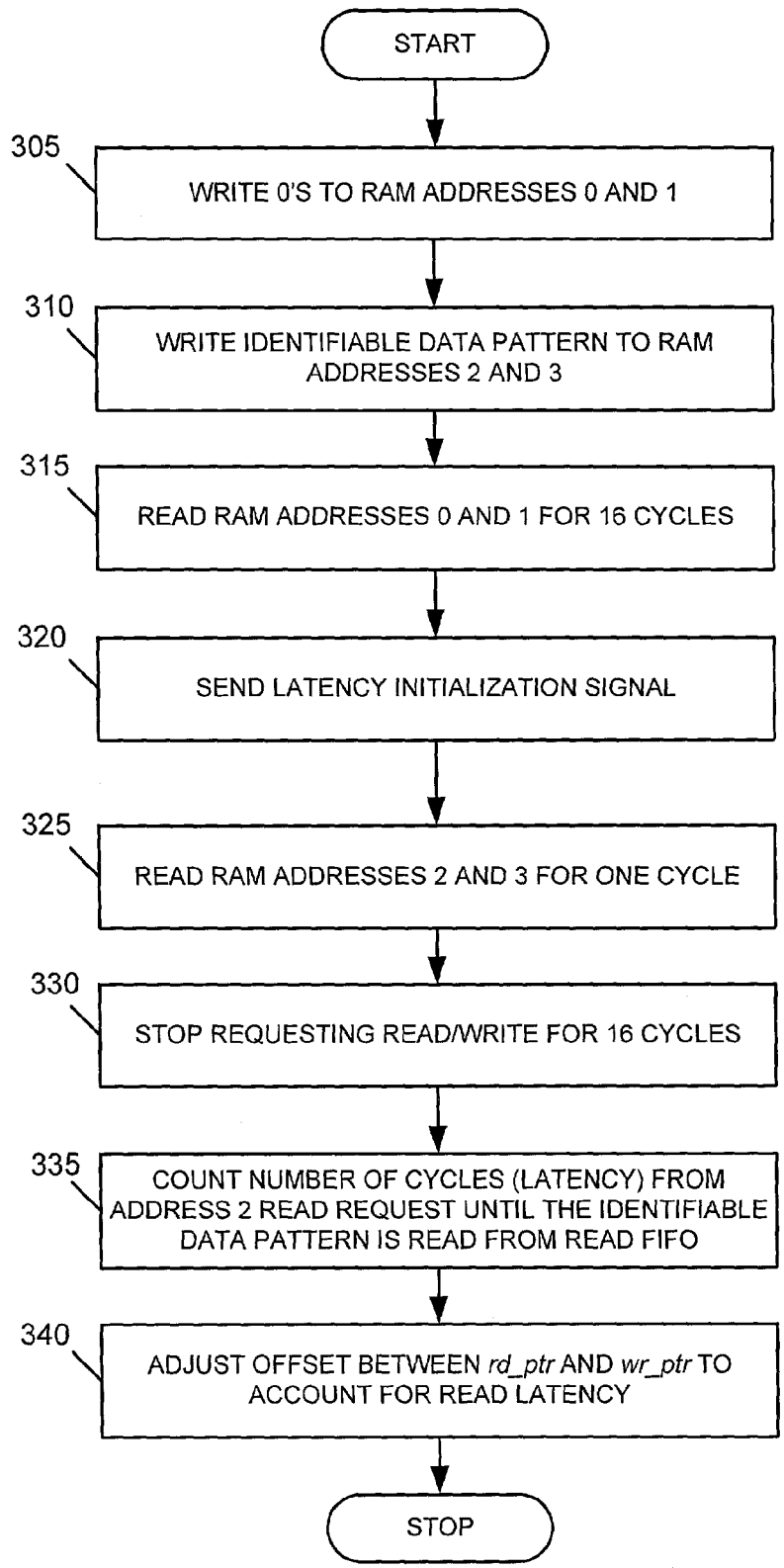
FIG. 3 is an exemplary flowchart of a memory read response latency detection process consistent with the principles of the invention.

FIG. 3 is a flowchart of an exemplary memory read latency detection process that may be implemented by a system, such as system 100, consistent with the principles of the invention. A predetermined pattern, such as zeros (0's), may first be written to certain RAM 110 addresses, such as addresses 0 and 1 (act 305). To write 0's to RAM 110 addresses 0 and 1, read latency detector 205 may send write requests, write addresses and write data via write request line 120, write address line 125 and write data line 130, respectively. An identifiable data pattern (e.g., hexadecimal 5's (0101 . . . ) and A's (1010 . . . )) may then be written to other RAM 110 addresses, such as addresses 2 and 3 (act 310). To write an identifiable data pattern to addresses 2 and 3, read latency detector 205 may send write requests, write addresses and write data via write request line 120, write address line 125 and write data line 130.

Data from RAM 110 addresses 0 and 1 may then be read for multiple cycles (e.g., 16) to ensure all ASIC buffers are cleared (act 315). To read data from RAM 110 addresses 0 and 1, read latency detector 205 may send read requests and read addresses via read request line 115 and read address line 125. In response to the read requests, data from RAM 110 addresses 0 and 1 may be passed, via an input buffer 255, to read FIFO 210. To start latency determination, a latency initialization signal may be sent (act 320) and data from RAM 110 addresses 2 and 3 may be read from RAM 110 addresses 2 and 3 (act 325). To read data from RAM 110 addresses 2 and 3, R/W processor 280 may send read requests and read addresses via read request line 115 and read address line 125. In response to the read requests, data from RAM 110 addresses 2 and 3 may be passed, via an input buffer 255, to read FIFO 210. Read/write requests may then be stopped for multiple cycles (e.g., 16) (act 330).

A number of cycles of clock 235 (/4 clock), from the time of the address 2 read request until the identifiable data pattern (e.g., multiple 0's followed by a first 1 bit) is read from read FIFO 210, may be counted to determine a read latency (act 335). Read latency detector 205 may, thus, count the number of clock cycles from the time an address 2 read request is sent on read request line 115 until the identifiable data pattern is detected on read data output line 230 from read FIFO 210. Read latency detector 205 may store the determined read latency internally or in an external memory. The determined read latency may be used to synchronize any subsequent read requests from ASIC 105 to RAM 110. For example, read latency detector 205 may adjust an offset between rd_ptr 215 and wr_ptr 220 to account for the determined read latency (act 340). The exemplary read response latency detection process of acts 305–340 may be selectively repeated to update the detected latency value.

Exemplary Memory Read Process

Figure 4:
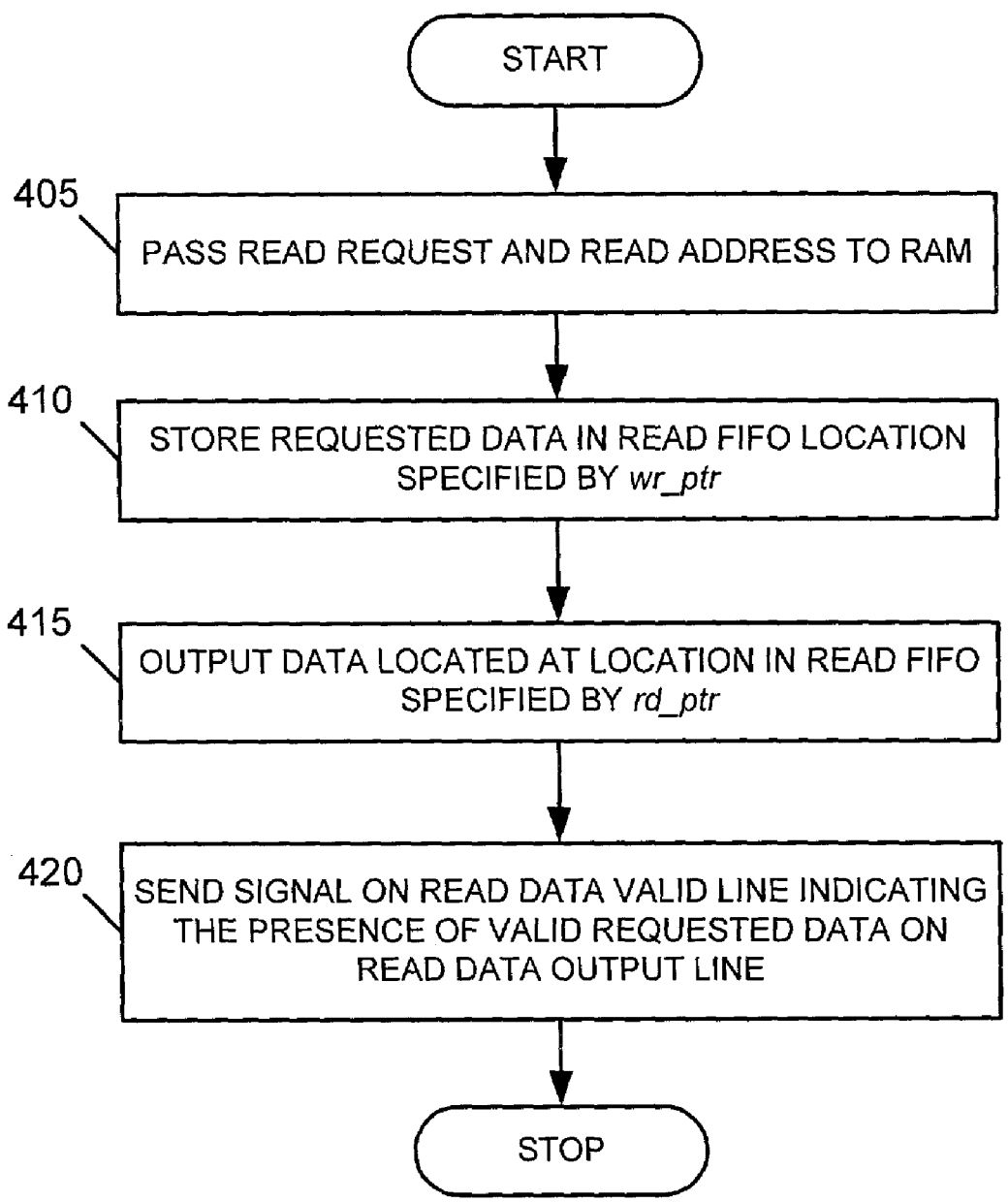
FIG. 4 is an exemplary flowchart of an exemplary memory read process consistent with the principles of the invention.

FIG. 4 is a flowchart of an exemplary memory read process that may be implemented by a system, such as system 100, consistent with the principles of the invention. A read request, and associated address, may be passed via read request line 115 and read/write address line 125 to RAM 110 (act 405). The requested data may be received from RAM 110 via input buffer 255 and read data line 135 and stored in a location in read FIFO 210 specified by wr_ptr 220 (act 410). Data located at a location in read FIFO 210 specified by rd_ptr 215 may then be output on read data output line 230 (act 415). Read latency detector 205 may send a signal on read data valid line 250 indicating the presence of valid requested data on output line 230 (act 420).

CONCLUSION

Consistent with the principles of the present invention, memory read response latency detection circuitry may be implemented in data processing systems to synchronize memory read circuitry so as to account for the detected latency when performing reads from memory. Through provision of a detected read response latency parameter that may be selectively updated, systems and methods consistent with the principles of the invention can improve the system read access capability and increase the quantity of data that can be retrieved from memory as compared to, for example, conventional fixed, worst case, read response delays.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 3–4, when acts are not dependent on a particular order the order of the acts may differ or be performed in parallel in other implementations consistent with the present invention. Moreover, non-dependent acts can be performed in parallel. No element, act, or instruction used in the description of the principles of the invention should be construed as critical unless explicitly described as such. Also as used herein, the article "a" is intended to include one or more items. Where only one item is intended, the term "one" or similar language is used.

The scope of the invention is defined by the claims and their equivalents.

What is claimed is:

1. A method of determining a memory read latency, comprising:
   writing an identifiable pattern of data to at least one location in a memory;
   sending a read request and an address to the memory, the address identifying the at least one location in memory;
   receiving, in response to the read request, the identifiable pattern of data;
   storing the identifiable pattern of data in a queue in a first location specified by contents of a first pointer;
   retrieving the data from a second location in the queue specified by contents of a second pointer; and
   determining a read latency period based on when the identifiable pattern of data is retrieved from the queue.

2. The method of claim 1, wherein the read latency period comprises a number of cycles of a system clock.

3. The method of claim 1, wherein the identifiable pattern of data is detected at a latency detector.

4. The method of claim 1, wherein the latency detector comprises logic residing in an Application Specific Integrated Circuit (ASIC).

5. The method of claim 1, wherein the identifiable pattern of data comprises a sequence of logic low bits followed by at least one logic high bit.

6. The method of claim 1, further comprising:
   modifying the contents of at least one of the first and second pointers based on the determined read latency period.

7. A system for determining a memory read latency, comprising:
   a memory;
   a memory read circuit configured to:
      write an identifiable pattern of data to at least one location in the memory; and
      send a read request and an address to the memory, the address identifying the at least one location in memory;
   a queue configured to:
      receive, in response to the read request, the identifiable pattern of data from the data;
      store the identifiable pattern of data in a first location specified by contents of a first pointer; and
      output the identifiable pattern of data from a second location specified by contents of a second pointer; and
   a latency detector configured to:
      determine a read latency period based on when the identifiable pattern of data is output from the queue.

8. The system of claim 7, wherein the read latency period comprises a number of cycles of a system clock.

9. The system of claim 7, wherein the latency detector comprises logic residing in an Application Specific Integrated Circuit (ASIC).

10. The system of claim 7, wherein the identifiable pattern of data comprises a sequence of logic-low bits followed by at least one logic-high bit.

11. The system of claim 7, wherein the latency detector is further configured to:
   modify the contents of at least one of the first and second pointers based on the determined read latency period.

12. A method for synchronizing a memory read, comprising:
   receiving requested data from a memory responsive to a first memory read request;
   storing the requested data in a first location in a queue specified by a first pointer;
   retrieving the requested data from a second location in the queue specified by a second pointer;
   detecting a latency based on when the requested data is retrieved from the queue; and
   adjusting a pointer value of at least one of the first and second pointers to account for the detected latency.

13. The method of claim 12, comprising:
   receiving a second memory read request; and
   waiting a period based on the detected latency before sending the second requested data to a destination.

14. The method of claim 12, comprising:
receiving a second memory read request; and
waiting a period based on the detected latency before transmitting a data read acknowledgement.

15. A circuit, comprising:
memory read circuitry configured to:
   send a first read request to a memory to retrieve specific data from the memory;
a queue configured to:
   receive, in response to the first read request, the specific data from the memory;
   store the specific data in a first location indicated by contents of a first pointer; and
   output the specific data from a second location indicated by contents of a second pointer; and
a latency detector configured to:
   determine a latency based on when the specific data is output from the queue.

16. The circuit of claim 15, the latency detector further configured to:
receive an indication of a second read request, and
wait a period based on the determined latency before transmitting a data read acknowledgement.

17. The circuit of claim 15, the memory read circuitry further configured to:
wait a period based on the determined latency before expecting to receive the data from the memory.

18. A system for synchronizing a memory read, comprising:
means for receiving requested data from a memory responsive to a memory read request;
a queue for storing the requested data in a first location in the queue specified by a first pointer;
means for retrieving the requested data from a second location in the queue specified by a second pointer;
means for detecting a latency based on a time at which the requested data is retrieved from the queue; and
means for adjusting a pointer value of at least one of the first and second pointers to account for the detected latency.

19. A method, comprising:
determining a latency period associated with reading data from a memory;
receiving a read request to request data from the memory;
receiving the requested data from the memory in response to the read request;
selectively storing the requested data in a queue; and
selectively retrieving the requested data from the queue based on the determined latency.

20. The method of claim 19, wherein selectively storing the requested data in the queue comprises:
storing the requested data in a first location in the queue specified by a first pointer.

21. The method of claim 20, wherein selectively retrieving the requested data from the queue comprises:
selectively retrieving the requested data from a second location in the queue specified by a second pointer.

22. The method of claim 21, further comprising:
incrementing the first and second pointers at each cycle of at least one system clock.

23. The method of claim 22, further comprising:
adjusting an offset between the first and second pointers based on the determined latency.

24. A system, comprising:
a latency detector configured to determine a latency period associated with reading data from a memory;
a queue configured to:
   receive requested data from the memory in response to a read request,
   selectively store the requested data, and
   selectively output the requested data based on the determined latency.

25. The system of claim 24, wherein the queue is further configured to:
store the requested data in a first location of the queue specified by a first pointer.

26. The system of claim 25, wherein the queue is further configured to:
selectively output the requested data from a second location of the queue specified by a second pointer.

27. The system of claim 26, wherein the latency detector is further configured to:
increment the first and second pointers at each cycle of at least one system clock.

28. The system of claim 27, wherein the latency detector is further configured to:
adjust an offset between the first and second pointers based on the determined latency.

* * * * *